US012803052B2

(12) United States Patent
Yu et al.

(10) Patent No.: US 12,803,052 B2
(45) Date of Patent: Nov. 17, 2026

(54) NON-AQUEOUS ELECTROLYTE AND LITHIUM-ION BATTERY COMPRISING NON-AQUEOUS ELECTROLYTE

(71) Applicant: ZHANGJIAGANG GUOTAI-HUARONG NEW CHEMICAL MATERIALS CO., LTD, Suzhou (CN)

(72) Inventors: Linpo Yu, Suzhou (CN); Xintao Zhao, Suzhou (CN); Kaichen Xu, Suzhou (CN); Zhitao Wang, Suzhou (CN); Chunyan Liu, Suzhou (CN); Chaolun Gan, Suzhou (CN)

(73) Assignee: ZHANGJIAGANG GUOTAI-HUARONG NEW CHEMICAL MATERIALS CO., LTD., Jiangsu (CN)

( * ) Notice: Subject to any disclaimer, the term of this patent is extended or adjusted under 35 U.S.C. 154(b) by 514 days.

(21) Appl. No.: 18/555,953

(22) PCT Filed: Mar. 9, 2022

(86) PCT No.: PCT/CN2022/079923

§ 371 (c)(1),
(2) Date: Oct. 18, 2023

(87) PCT Pub. No.: WO2023/123673

PCT Pub. Date: Jul. 6, 2023

(65) Prior Publication Data

US 2024/0213538 A1 Jun. 27, 2024

(30) Foreign Application Priority Data

Dec. 28, 2021 (CN) ......................... 202111626579.9
Dec. 28, 2021 (CN) ......................... 202111628953.9

(51) Int. Cl.

*H01M 10/0567* (2010.01)
*H01M 4/525* (2010.01)
*H01M 4/587* (2010.01)
*H01M 10/0525* (2010.01)
*H01M 10/42* (2006.01)

(52) U.S. Cl.

CPC ....... *H01M 10/0567* (2013.01); *H01M 4/525* (2013.01); *H01M 4/587* (2013.01); *H01M 10/0525* (2013.01); *H01M 10/4235* (2013.01); *H01M 2300/004* (2013.01)

(58) Field of Classification Search

None
See application file for complete search history.

(56) References Cited

U.S. PATENT DOCUMENTS

2019/0393546 A1* 12/2019 Dahn ................ H01M 10/0567

FOREIGN PATENT DOCUMENTS

| | | | | |
|---|---|---|---|---|
| CN | 105280962 A | 1/2016 | | |
| CN | 108736065 A | * 11/2018 | ............ | H01M 4/131 |
| CN | 110400968 A | 11/2019 | | |
| CN | 112310477 A | 2/2021 | | |
| CN | 112635827 A | 4/2021 | | |
| JP | 2015060734 A | 3/2015 | | |

OTHER PUBLICATIONS

International Search Report issued in International Application No. PCT/CN2022/079923, mailed on Aug. 25, 2022.
Notice of First Examination Opinion issued in Chinese Application No. 202111628953.9, dated Sep. 13, 2023.

* cited by examiner

*Primary Examiner* — Carlos Barcena
(74) *Attorney, Agent, or Firm* — Knobbe, Martens, Olson & Bear, LLP

(57) ABSTRACT

A non-aqueous electrolyte and a lithium-ion battery containing the non-aqueous electrolyte. The non-aqueous electrolyte contains a lithium salt, an organic solvent, and an additive. The additive contains 2-phenyl-benzothiazole and a derivative thereof, and can form a passive film on the surface of a positive electrode when a lithium-ion battery is overcharged, so as to prevent the voltage of the battery from further increasing during overcharging; the additive makes the temperature of the electrolyte rise slower during overcharging; and the addition of the additive not only do not affect the room temperature cycle performance of the lithium-ion battery, but also can even improve the room temperature cycle performance of the lithium-ion battery, thereby effectively avoiding the potential safety hazards caused by battery overcharging.

12 Claims, 1 Drawing Sheet

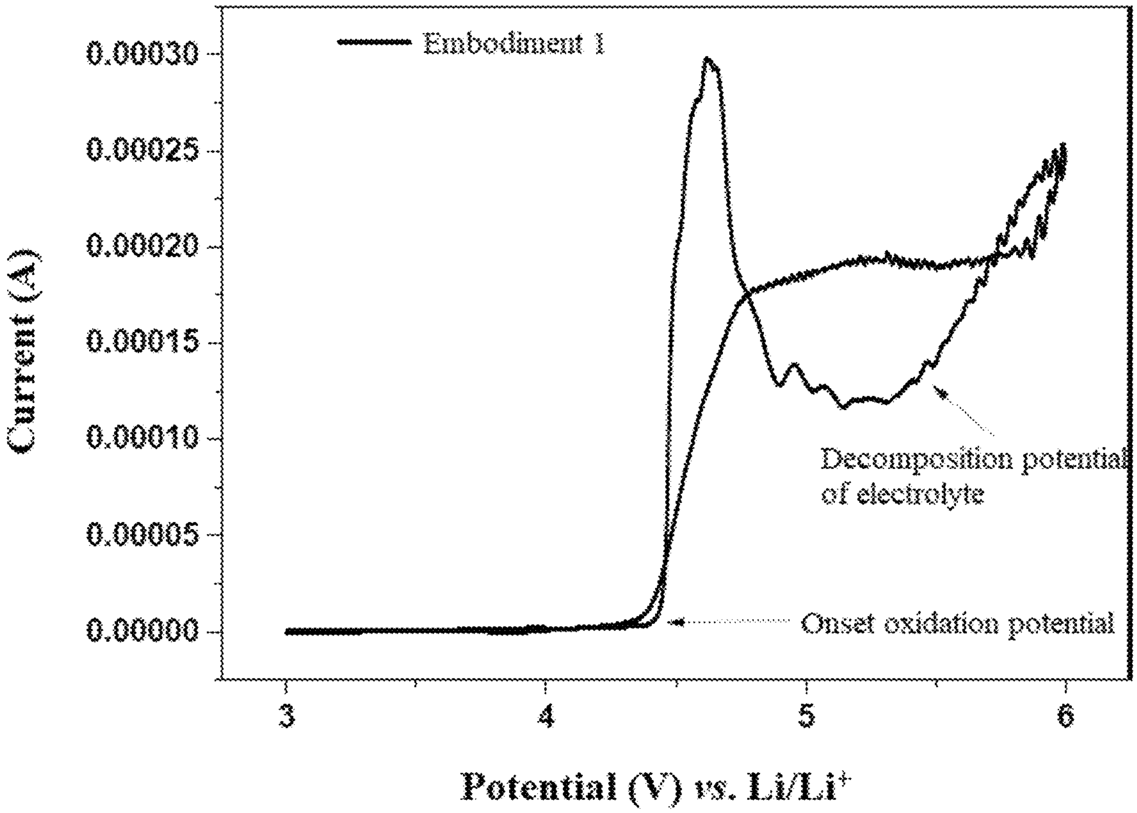
Embodiment 1
0.00030
0.00025
0.00020
0.00015
0.00010
0.00005
0.00000
Current (A)
3
4
5
6
Potential (V) vs. Li/Li+
Decomposition potential of electrolyte
Onset oxidation potential

NON-AQUEOUS ELECTROLYTE AND LITHIUM-ION BATTERY COMPRISING NON-AQUEOUS ELECTROLYTE

CROSS-REFERENCE TO RELATED APPLICATIONS

This application is the U.S. National Stage of PCT/CN2022/079923 filed on Mar. 9, 2022, which claims priority to Chinese Patent Applications 202111626579.9 filed on Dec. 28, 2021 and 202111628953.9 filed on Dec. 28, 2021, the entire content of both are incorporated herein by reference in their entirety.

TECHNICAL FIELD

The present disclosure belongs to the field of lithium battery technology, and particularly, relates to a non-aqueous electrolyte and a lithium-ion battery containing the same.

BACKGROUND

Lithium-ion batteries have the highest energy density among commercially available secondary batteries, and are thus widely used in scenarios such as mobile electronics, green transportation, and large-scale energy storage. Since the first commercial application of lithium-ion batteries in 1990, the lithium-ion battery industry has maintained rapid growth. Lithium-ion batteries, due to their high energy density, have rapidly taken over the market of mobile electronic energy storage products since their commercialization. In the past decade, along with the world's attention to energy security and development of sustainable energy, lithium-ion battery, as an important electrochemical energy storage device, has been pushed onto the fast track of scientific research and industrial development.

At present, the electrolyte used in commercialized lithium-ion batteries is consisted of an organic solvent and lithium salts such as $LiPF_6$ dissolved therein. Wherein the organic solvent is usually a binary or ternary mixed solvent based on ethylene carbonate (EC) with a high dielectric constant, wherein chain carbonate (dimethyl carbonate (DMC); diethyl carbonate (DEC); ethyl methyl carbonate (EMC)), carboxylates, or ethers are co-solvents. These commonly used solvents have the characteristics of good solubility with lithium salts, high conductivity of the electrolyte formed, and the ability to form stable SEI films at positive and negative electrodes, and thus they are considered to be the best choices of solvents for electrolyte systems, especially for electrolyte solvents of electric vehicle batteries. The flammability of these solvents, however, makes it necessary to limit the misuse of batteries in their daily use.

Currently, as the application of lithium-ion batteries becomes more and more widespread, safety accidents caused by battery misuse due to various reasons occur from time to time, causing the public to have great safety anxiety about the application of lithium-ion batteries.

The main purpose of overcharge protection for lithium-ion batteries is to prevent chain reactions and then combustion caused by electrolyte decomposition and heating due to overcharge. Currently, commonly used overcharge protection additives mainly include biphenyl, 2-fluorobiphenyl and cyclohexylbenzene, which have certain overcharge protection performance, but can lead to an increase in the battery temperature and have a certain impact on the cycling performance of the batteries. Therefore, the development of new electrolytes with overcharge protection performance and less impact on the cycling performance of batteries is desired in the market.

SUMMARY

An aspect of the present disclosure relates to a non-aqueous electrolyte having overcharge protection characteristics and capable of improving the cycling performance of lithium-ion batteries at room temperature.

Another aspect of the present disclosure relates to a lithium-ion battery that has good cycling performance at room temperature, insignificant temperature increase when overcharged, and can effectively prevent overcharge to a certain extent.

A non-aqueous electrolyte is provided, comprising a lithium salt, an organic solvent and an additive, wherein the additive comprises 2-phenyl-benzothiazole or a derivative thereof having the structure shown in formula (1), (1)

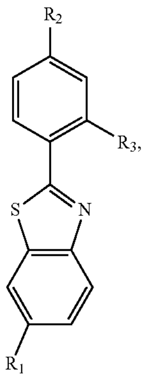

wherein, $R_1$, $R_2$ and $R_3$ are independently selected from the group consisting of H, halogen atoms and alkyl.

In some embodiments, $R_1$, $R_2$ and $R_3$ are independently selected from the group consisting of H, Cl, F, $C_1$-$C_4$ linear alkyl, and t-butyl.

In some embodiments, $R_1$, $R_2$ and $R_3$ are independently selected from the group consisting of H, Cl and F.

In some embodiments, the additive comprises one or more of the following compounds:

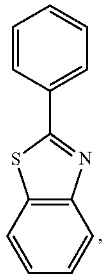
,
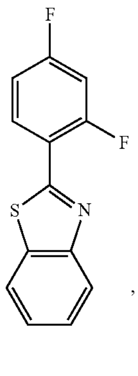
,
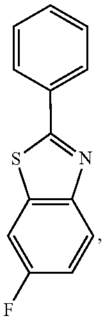
,
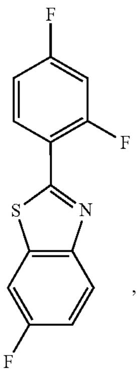
,

-continued

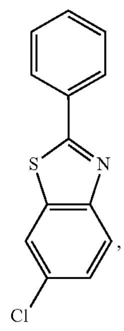, and 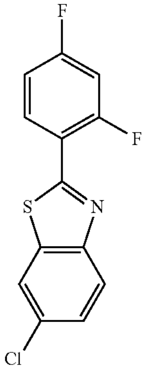.

In some embodiments, 2-phenyl-benzothiazole or a derivative thereof having the structure shown in formula (1) accounts for 0.1-10 wt % of the total mass of the non-aqueous electrolyte.

In some embodiments, 2-phenyl-benzothiazole or a derivative thereof having the structure shown in formula (1) accounts for 0.1-5 wt % of the total mass of the non-aqueous electrolyte. When the feeding amount of the additive is within an appropriate range, it can effectively prevent overcharge and has little impact on cycling performance of the battery at room temperature.

In some embodiments, the additive further comprises 3-phenyl-1,4,2-dioxazol-5-one (PDO) and optionally other additive, and the other additive is selected from the group consisting of vinylene carbonate (VC), 1,3-propane sultone (PS), propene-1,3-sultone (PST), ethylene sulfate (DTD), lithium difluorophosphate ($LiPO_2F_2$), and combinations thereof. By combining 3-phenyl-1,4,2-dioxazol-5-one with 2-phenyl-benzothiazole or a derivative thereof having the structure shown in formula (1), the problem of the degradation in the cycling performance of lithium-ion batteries at high temperatures caused by 2-phenyl-benzothiazole or a derivative thereof having the structure shown in formula (1) is alleviated, and the cycling performance of lithium-ion batteries at room temperature will not be affected.

In some embodiments, the additive comprises 3-phenyl-1,4,2-dioxazol-5-one, 2-phenyl-benzothiazole or a derivative thereof having the structure shown in formula (1), and other additive. Further, the combination of 3-phenyl-1,4,2-dioxazol-5-one and the other additive with 2-phenyl-benzothiazole or a derivative thereof having the structure shown in formula (1) further improves the cycling performance of lithium-ion batteries at high temperatures, effectively prevents the combustion or explosion of lithium-ion batteries due to overcharge, and expands the use temperature range of lithium-ion batteries while ensuring the overcharge protection performance.

In some embodiments, the other additive is ethylene sulfate DTD and/or lithium difluorophosphate ($LiPO_2F_2$).

In some embodiments, the feeding mass of 3-phenyl-1,4,2-dioxazol-5-one is 0.1-10 wt % of the total mass of the non-aqueous electrolyte.

In some embodiments, the feeding mass of 3-phenyl-1,4,2-dioxazol-5-one is 0.1-5 wt % of the total mass of the non-aqueous electrolyte.

In some embodiments, the feeding mass of 3-phenyl-1,4,2-dioxazol-5-one is 0.1-3 wt % of the total mass of the non-aqueous electrolyte. An appropriate amount of 3-phenyl-1,4,2-dioxazol-5-one can alleviate the problem of rapid degradation of cycling capacity at high temperatures caused by 2-phenyl-benzothiazole or a derivative thereof having the structure shown in formula (1).

In some embodiments, the feeding mass of the other additive is 0.1-10 wt % of the total mass of the non-aqueous electrolyte.

In some embodiments, the feeding mass of the other additive is 0.1-5 wt % of the total mass of the non-aqueous electrolyte.

When an appropriate amount of 3-phenyl-1,4,2-dioxazol-5-one is combined with an appropriate amount of the other additive, the problem of rapid degradation of cycling capacity at high temperatures caused by 2-phenyl-benzothiazole or a derivative thereof having the structure shown in formula (1) can be completely overcome, and even the cycling performance of lithium-ion batteries at high temperatures can be improved.

In some embodiments, the organic solvent comprises a cyclic ester and/or a chain ester, the cyclic ester is selected from the group consisting of γ-butyrolactone, ethylene carbonate, propylene carbonate, fluoroethylene carbonate, and combinations thereof; the chain ester is selected from the group consisting of dimethyl carbonate, ethyl methyl carbonate, diethyl carbonate, methyl propyl carbonate, methyl propionate, ethyl propionate, propyl propionate, methyl acetate, ethyl acetate, propyl acetate, methyl butyrate, ethyl butyrate, propyl butyrate, methyl fluoropropionate, ethyl fluoropropionate, ethyl fluoroacetate, and combinations thereof.

In some embodiments, the organic solvent is a mixture of the cyclic ester and the chain ester, wherein the cyclic ester is mixed with the chain ester in a mass ratio of 1: (1-2.5).

In some embodiments, the cyclic ester is mixed with the chain ester in a mass ratio of 1: (1.5-2).

In some embodiments, the lithium salt is selected from the group consisting of lithium hexafluorophosphate, lithium tetrafluoroborate, lithium hexafluoroarsenate, anhydrous lithium perchlorate, lithium bis(trifluoromethanesulfonyl) imide, lithium difluorobis(oxalate)phosphate, lithium difluorophosphate ($LiPO_2F_2$), lithium trifluoromethanesulfonate, lithium difluorobisoxalate phosphate, lithium bis (oxalate) borate, lithium oxalyldifluoroborate, lithium difluorobisoxalate phosphate, and combinations thereof.

In some embodiments, the concentration of the lithium salt is 0.6-1.5 mol/L.

In some embodiments, the concentration of the lithium salt is 0.8-1.3 mol/L.

A lithium-ion battery is further provided, comprising a cathode, an anode and an electrolyte, the electrolyte is the above-mentioned non-aqueous electrolyte.

In some embodiments, the cathode is made of lithium cobalt oxide material or lithium nickel cobalt manganese oxide material.

In some embodiments, the anode is made of graphite material.

2-phenyl-benzothiazole or a derivative thereof having the structure shown in formula (1) of the present disclosure can form a passive film on the cathode surface when the lithium-ion battery is overcharged, preventing the battery voltage from further increasing during the overcharge process, and the additive also slows down the temperature rise of the electrolyte during overcharge, and its addition not only do not affect the cycling performance of lithium-ion battery at room temperature, but also can even improve the cycling performance of lithium-ion battery at room temperature, effectively avoiding safety hazards caused by overcharge.

BRIEF DESCRIPTION OF THE DRAWINGS

The FIGURE is the cyclic voltammogram of the non-aqueous electrolyte in the three-electrode system of Embodiment 1, with scanning speed of 5 mV/s.

DETAILED DESCRIPTION OF EXEMPLARY EMBODIMENTS

The present disclosure is further described below combining with specific embodiments. However, the present disclosure is not limited to these embodiments. The implementation conditions employed by the embodiments may be further adjusted according to particular requirements, and undefined implementation conditions usually are conditions in conventional experiments. The technical features involved in the respective implementations of the present disclosure can be combined with each other if they do not conflict with each other.

The present disclosure mainly conducts a lot of research and experimental verification on additives of lithium battery electrolyte from the perspective of preventing battery overcharge, and finally provides a non-aqueous electrolyte and a related lithium-ion battery.

According to the present disclosure, the non-aqueous electrolyte comprises a lithium salt, a solvent and an additive, wherein the additive comprises 2-phenyl-benzothiazole or a derivative thereof having the structure shown in formula (1), (1)

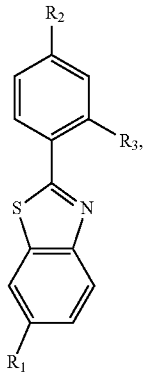

wherein, $R_1$, $R_2$ and $R_3$ are independently selected from the group consisting of H, halogen atoms and alkyl.

Preferably, $R_1$, $R_2$ and $R_3$ are independently selected from the group consisting of H, Cl, F, $C_1$-$C_4$ linear alkyl, and t-butyl.

Preferably, $R_1$, $R_2$ and $R_3$ are independently selected from the group consisting of H, Cl and F.

According to the present disclosure, Compounds 1-6 are preferably selected, and their molecular structures are as follows:

Compound 1

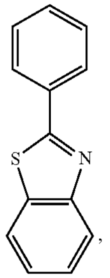

-continued

Compound 2

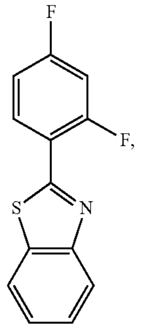

Compound 3

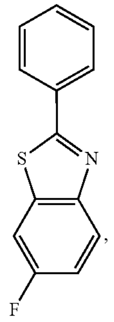

Compound 4

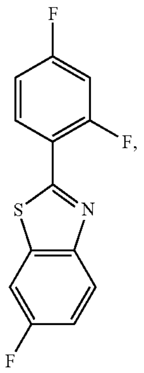

Compound 5

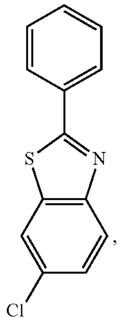

-continued

Compound 6

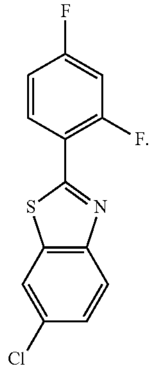

According to the present disclosure, the amount of 2-phenyl-benzothiazole or its derivative is 0.1-10 wt %, for example, 0.1 wt %, 0.5 wt %, 1 wt %, 1.5 wt %, 2 wt %, 2.5 wt %, 3 wt %, 3.5 wt %, 4 wt %, 4.5 wt %, 5 wt %, 5.5 wt %, 6 wt %, 6.5 wt %, 7 wt %, 8.5 wt %, 9 wt %, 9.5 wt %, 10 wt %. An appropriate amount of 2-phenyl-benzothiazole or its derivative can effectively prevent overcharge and has little impact on cycling performance of the battery at room temperature.

However, with the deepening of research, the inventors have found that the fading of the cycling capacity of the electrolyte added with 2-phenyl-benzothiazole or its derivative was great under high temperature conditions.

The inventors believe that it may be due to the slow reaction of 2-phenyl-benzothiazole or its derivative with the cathode of the battery under high temperature conditions, which gradually forms a non-conductive polymer film and affects the cycling performance. To solve the problem, based on the addition of 2-phenyl-benzothiazole or its derivative, the inventors introduced 3-phenyl-1,4,2-dioxazol-5-one, which can preferentially form protective films at the cathode and anode of the battery and inhibit the interaction of 2-phenyl-benzothiazole or its derivative with the electrode materials of the battery in the operating voltage range of the battery. Furthermore, other conventional auxiliary additive (namely other additive) was introduced to further ensure the comprehensive performance of overcharge protection electrolyte.

According to the present disclosure, the amount of 3-phenyl-1,4,2-dioxazol-5-one is 0.1-10 wt %, for example, 0.1 wt %, 0.5 wt %, 1 wt %, 1.5 wt %, 2 wt %, 2.5 wt %, 3 wt %, 3.5 wt %, 4 wt %, 4.5 wt %, 5 wt %, 5.5 wt %, 6 wt %, 6.5 wt %, 7 wt %, 8.5 wt %, 9 wt %, 9.5 wt %, 10 wt %, preferably 0.1-5 wt %, further preferably 0.1-3 wt %. An appropriate amount of 3-phenyl-1,4,2-dioxazol-5-one can effectively alleviate the problem of performance reduction at high temperatures caused by 2-phenyl-benzothiazole or its derivative, so that the electrolyte still has a high cycling capacity at high temperatures.

According to the present disclosure, the amount of the other additive is 0.1-10 wt %, for example, 0.1 wt %, 0.5 wt %, 1 wt %, 1.5 wt %, 2 wt %, 2.5 wt %, 3 wt %, 3.5 wt %, 4 wt %, 4.5 wt %, 5 wt %, 5.5 wt %, 6 wt %, 6.5 wt %, 7 wt %, 8.5 wt %, 9 wt %, 9.5 wt %, 10 wt %, preferably 0.1-5 wt %. An appropriate amount of the other additive can assist 3-phenyl-1,4,2-dioxazol-5-one and 2-phenyl-benzothiazole or its derivative to improve the comprehensive performance of the lithium-ion battery.

According to the present disclosure, the organic solvent is a cyclic ester and/or a chain ester, the cyclic ester is selected from the group consisting of γ-butyrolactone, ethylene carbonate, propylene carbonate, fluoroethylene carbonate, and combinations thereof: the chain ester is selected from the group consisting of dimethyl carbonate, ethyl methyl carbonate, diethyl carbonate, methyl propyl carbonate, methyl propionate, ethyl propionate, propyl propionate, methyl acetate, ethyl acetate, propyl acetate, methyl butyrate, ethyl butyrate, propyl butyrate, methyl fluoropropionate, ethyl fluoropropionate, ethyl fluoroacetate, and combinations thereof.

Preferably, the organic solvent is a mixture of the cyclic ester and the chain ester, wherein the cyclic ester is mixed with the chain ester in a mass ratio of 1:(1-2.5), for example, 1:1, 1:1.2, 1:1.4, 1:1.6, 1:1.8, 1:2, 1:2.2, 1:2.4, 1:2.5.

According to the present disclosure, the lithium salt is selected from the group consisting of lithium hexafluorophosphate, lithium tetrafluoroborate, lithium hexafluoroarsenate, anhydrous lithium perchlorate, lithium bis(trifluoromethanesulfonyl)imide, lithium difluorobis(oxalate) phosphate, lithium difluorophosphate, lithium trifluoromethanesulfonate, lithium difluorobisoxalate phosphate, lithium bis(oxalate)borate, lithium oxalyldifluoroborate, lithium difluorobisoxalate phosphate, and combinations thereof.

According to the present disclosure, the concentration of the lithium salt is 0.6-1.5 mol/L, for example, 0.6 mol/L, 0.8 mol/L, 1 mol/L, 1.2 mol/L, 1.4 mol/L, 1.5 mol/L.

By selecting a specially formulated organic solvent and combining with 2-phenyl-benzothiazole or its derivative and the lithium salt, the performance of the lithium-ion battery can be improved.

According to the present disclosure, the lithium-ion battery comprises a cathode, an anode, and an electrolyte, wherein, the electrolyte is the above-mentioned non-aqueous electrolyte, the cathode is made of lithium cobalt oxide material or lithium nickel cobalt manganese oxide material, and the anode is made of graphite material.

The non-aqueous electrolyte provided by the present disclosure has overcharge protection characteristic in lithium-ion batteries, and the advantages of not significantly increasing the battery temperature when overcharged to 130% SOC, and improving the cycling performance of the batteries at room temperature. Furthermore, by compounding other specific additives in the electrolyte, the cycling performance of the batteries at high temperatures can be further improved.

The technical solutions and effects of the present disclosure are further explained through embodiments and comparative examples.

The reagents and the like used in the following embodiments and comparative examples are commercially available.

Embodiment 1

In an argon-filled glove box ($H_2O$<10 ppm, $O_2$<10 ppm), DMC, EC, and EMC were mixed well at a mass ratio of 1:1:1, to prepare a mixed solvent. Then, 1 equivalent amount of $LiPF_6$ was weighed and dissolved in the mixed solvent to prepare an electrolyte containing 1 mol/L $LiPF_6$. Finally, 1 wt % of Compound 1 was added to the electrolyte to give the target electrolyte.

Embodiment 2

In an argon-filled glove box ($H_2O$<10 ppm, $O_2$<10 ppm), DMC, EC, and EMC were mixed well at a mass ratio of 1:1:1, to prepare a mixed solvent. Then, 1 equivalent amount of $LiPF_6$ was weighed and dissolved in the mixed solvent to prepare an electrolyte containing 1 mol/L $LiPF_6$. Finally, 1 wt % of Compound 2 was added to the electrolyte to give the target electrolyte.

Embodiment 3

In an argon-filled glove box ($H_2O$<10 ppm, $O_2$<10 ppm), DMC, EC, and EMC were mixed well at a mass ratio of 1:1:1, to prepare a mixed solvent. Then, 1 equivalent amount of $LiPF_6$ was weighed and dissolved in the mixed solvent to prepare an electrolyte containing 1 mol/L $LiPF_6$. Finally, 1 wt % of Compound 3 was added to the electrolyte to give the target electrolyte.

Embodiment 4

In an argon-filled glove box ($H_2O$<10 ppm, $O_2$<10 ppm), DMC, EC, and EMC were mixed well at a mass ratio of 1:1:1, to prepare a mixed solvent. Then, 1 equivalent amount of $LiPF_6$ was weighed and dissolved in the mixed solvent to prepare an electrolyte containing 1 mol/L $LiPF_6$. Finally, 1 wt % of Compound 4 was added to the electrolyte to give the target electrolyte.

Embodiment 5

In an argon-filled glove box ($H_2O$<10 ppm, $O_2$<10 ppm), DMC, EC, and EMC were mixed well at a mass ratio of 1:1:1, to prepare a mixed solvent. Then, 1 equivalent amount of $LiPF_6$ was weighed and dissolved in the mixed solvent to prepare an electrolyte containing 1 mol/L $LiPF_6$. Finally, 1 wt % of Compound 5 was added to the electrolyte to give the target electrolyte.

Embodiment 6

In an argon-filled glove box ($H_2O$<10 ppm, $O_2$<10 ppm), DMC, EC, and EMC were mixed well at a mass ratio of 1:1:1, to prepare a mixed solvent. Then, 1 equivalent amount of $LiPF_6$ was weighed and dissolved in the mixed solvent to prepare an electrolyte containing 1 mol/L $LiPF_6$. Finally, 1 wt % of Compound 6 was added to the electrolyte to give the target electrolyte.

Embodiment 7

In an argon-filled glove box ($H_2O$<10 ppm, $O_2$<10 ppm), DMC, EC, and EMC were mixed well at a mass ratio of 1:1:1, to prepare a mixed solvent. Then, 1 equivalent amount of $LiPF_6$ was weighed and dissolved in the mixed solvent to prepare an electrolyte containing 1 mol/L $LiPF_6$. Finally, 3 wt % of Compound 1 was added to the electrolyte to give the target electrolyte.

Embodiment 8

In an argon-filled glove box ($H_2O$<10 ppm, $O_2$<10 ppm), DMC, EC, and EMC were mixed well at a mass ratio of 1:1:1, to prepare a mixed solvent. Then, 1 equivalent amount of $LiPF_6$ was weighed and dissolved in the mixed solvent to prepare an electrolyte containing 1 mol/L $LiPF_6$. Finally, 3 wt % of Compound 2 was added to the electrolyte to give the target electrolyte.

Embodiment 9

In an argon-filled glove box ($H_2O$<10 ppm, $O_2$<10 ppm), DMC, EC, and EMC were mixed well at a mass ratio of 1:1:1, to prepare a mixed solvent. Then, 1 equivalent amount of $LiPF_6$ was weighed and dissolved in the mixed solvent to prepare an electrolyte containing 1 mol/L $LiPF_6$. Finally, 3 wt % of Compound 3 was added to the electrolyte to give the target electrolyte.

Embodiment 10

In an argon-filled glove box ($H_2O$<10 ppm, $O_2$<10 ppm), DMC, EC, and EMC were mixed well at a mass ratio of 1:1:1, to prepare a mixed solvent. Then, 1 equivalent amount of $LiPF_6$ was weighed and dissolved in the mixed solvent to prepare an electrolyte containing 1 mol/L $LiPF_6$. Finally, 3 wt % of Compound 4 was added to the electrolyte to give the target electrolyte.

Embodiment 11

In an argon-filled glove box ($H_2O$<10 ppm, $O_2$<10 ppm), DMC, EC, and EMC were mixed well at a mass ratio of 1:1:1, to prepare a mixed solvent. Then, 1 equivalent amount of $LiPF_6$ was weighed and dissolved in the mixed solvent to prepare an electrolyte containing 1 mol/L $LiPF_6$. Finally, 3 wt % of Compound 5 was added to the electrolyte to give the target electrolyte.

Embodiment 12

In an argon-filled glove box ($H_2O$<10 ppm, $O_2$<10 ppm), DMC, EC, and EMC were mixed well at a mass ratio of 1:1:1, to prepare a mixed solvent. Then, 1 equivalent amount of $LiPF_6$ was weighed and dissolved in the mixed solvent to prepare an electrolyte containing 1 mol/L $LiPF_6$. Finally, 3 wt % of Compound 6 was added to the electrolyte to give the target electrolyte.

Embodiment 13

In an argon-filled glove box ($H_2O$<10 ppm, $O_2$<10 ppm), DMC, EC, and EMC were mixed well at a mass ratio of 1:1:1, to prepare a mixed solvent. Then, 1 equivalent amount of $LiPF_6$ was weighed and dissolved in the mixed solvent to prepare an electrolyte containing 1 mol/L $LiPF_6$. Finally, 5 wt % of Compound 1 was added to the electrolyte to give the target electrolyte.

Embodiment 14

In an argon-filled glove box ($H_2O$<10 ppm, $O_2$<10 ppm), DMC, EC, and EMC were mixed well at a mass ratio of 1:1:1, to prepare a mixed solvent. Then, 1 equivalent amount of $LiPF_6$ was weighed and dissolved in the mixed solvent to prepare an electrolyte containing 1 mol/L $LiPF_6$. Finally, 5 wt % of Compound 2 was added to the electrolyte to give the target electrolyte.

Embodiment 15

In an argon-filled glove box ($H_2O$<10 ppm, $O_2$<10 ppm), DMC, EC, and EMC were mixed well at a mass ratio of 1:1:1, to prepare a mixed solvent. Then, 1 equivalent amount of $LiPF_6$ was weighed and dissolved in the mixed solvent to prepare an electrolyte containing 1 mol/L $LiPF_6$. Finally, 5 wt % of Compound 3 was added to the electrolyte to give the target electrolyte.

Embodiment 16

In an argon-filled glove box ($H_2O$<10 ppm, $O_2$<10 ppm), DMC, EC, and EMC were mixed well at a mass ratio of 1:1:1, to prepare a mixed solvent. Then, 1 equivalent amount of $LiPF_6$ was weighed and dissolved in the mixed solvent to prepare an electrolyte containing 1 mol/L $LiPF_6$. Finally, 5 wt % of Compound 4 was added to the electrolyte to give the target electrolyte.

Embodiment 17

In an argon-filled glove box ($H_2O$<10 ppm, $O_2$<10 ppm), DMC, EC, and EMC were mixed well at a mass ratio of 1:1:1, to prepare a mixed solvent. Then, 1 equivalent amount of $LiPF_6$ was weighed and dissolved in the mixed solvent to prepare an electrolyte containing 1 mol/L $LiPF_6$. Finally, 5 wt % of Compound 5 was added to the electrolyte to give the target electrolyte.

Embodiment 18

In an argon-filled glove box ($H_2O$<10 ppm, $O_2$<10 ppm), DMC, EC, and EMC were mixed well at a mass ratio of 1:1:1, to prepare a mixed solvent. Then, 1 equivalent amount of $LiPF_6$ was weighed and dissolved in the mixed solvent to prepare an electrolyte containing 1 mol/L $LiPF_6$. Finally, 5 wt % of Compound 6 was added to the electrolyte to give the target electrolyte.

Comparative Example 1

In an argon-filled glove box ($H_2O$<10 ppm, $O_2$<10 ppm), DMC, EC, and EMC were mixed well at a mass ratio of 1:1:1, to prepare a mixed solvent. Then, 1 equivalent amount of $LiPF_6$ was weighed and dissolved in the mixed solvent to give the target electrolyte containing 1 mol/L $LiPF_6$.

Comparative Example 2

In an argon-filled glove box ($H_2O$<10 ppm, $O_2$<10 ppm), DMC, EC, and EMC were mixed well at a mass ratio of 1:1:1, to prepare a mixed solvent. Then, 1 equivalent amount of $LiPF_6$ was weighed and dissolved in the mixed solvent to prepare an electrolyte containing 1 mol/L $LiPF_6$. Finally, 1 wt % of 2-fluorobiphenyl was added to the electrolyte to give the target electrolyte.

Comparative Example 3

In an argon-filled glove box ($H_2O$<10 ppm, $O_2$<10 ppm), DMC, EC, and EMC were mixed well at a mass ratio of 1:1:1, to prepare a mixed solvent. Then, 1 equivalent amount of $LiPF_6$ was weighed and dissolved in the mixed solvent to prepare an electrolyte containing 1 mol/L $LiPF_6$. Finally, 3 wt % of 2-fluorobiphenyl was added to the electrolyte to give the target electrolyte.

Comparative Example 4

In an argon-filled glove box ($H_2O$<10 ppm, $O_2$<10 ppm), DMC, EC, and EMC were mixed well at a mass ratio of 1:1:1, to prepare a mixed solvent. Then, 1 equivalent amount of $LiPF_6$ was weighed and dissolved in the mixed solvent to prepare an electrolyte containing 1 mol/L $LiPF_6$. Finally, 5 wt % of 2-fluorobiphenyl was added to the electrolyte to give the target electrolyte.

Performance Comparison:

(1) Additive Oxidative Polymerization Potential Test:

a three-electrode testing system was used, with a 3 mm-diameter platinum disk electrode as the working electrode, and two metal lithium sheets as the reference electrode and counter electrode, respectively, to characterize the passivation onset potential of each electrode in electrolyte and the oxidative decomposition potential of the electrolyte. The Figure shows the cyclic voltammogram of Embodiment 1 under test conditions, which indicates the onset oxidative polymerization potential of the additive and the oxidative decomposition potential of the electrolyte. The test results of Embodiments 1-6 are shown in Table 1. The experimental results show that Compounds 1-6 used in Embodiments 1-6 undergo oxidative polymerization reactions above 4.5 V (vs. $Li/Li^+$). After the three-electrode test, the surfaces of the working electrodes are covered with a layer of deep-colored polymer. This polymer can inhibit further increase in battery voltage when overcharging lithium-ion batteries.

TABLE 1

| Electrolytes | Onset oxidative polymerization potential (V vs. $Li/Li^+$) | Oxidative decomposition potential of electrolyte (V vs. $Li/Li^+$) |
|---|---|---|
| Embodiment 1 | 4.5 | 5.5 |
| Embodiment 2 | 4.7 | 5.5 |
| Embodiment 3 | 4.6 | 5.5 |
| Embodiment 4 | 4.8 | 5.5 |
| Embodiment 5 | 4.5 | 5.5 |
| Embodiment 6 | 4.7 | 5.5 |
| Comparative example 1 | N/A | 5.5 |
| Comparative example 2 | 4.5 | 5.5 |

(2) Cycling test of 4.2 V lithium cobalt oxide/graphite batteries at a rate of 1 C at room temperature was carried out, with charge and discharge cut-off voltages of 2.75 V and 4.2 V, respectively. The battery capacity retention rate after 200, 400, and 600 cycles at a rate of 1 C is shown in Table 2. From the experimental results of Comparative examples 1-4, it can be seen that the addition of the traditional overcharge protection additive 2-fluorobiphenyl seriously affects the cycling performance of the batteries. The battery capacity retention rate of Comparative examples 2-4 after 200, 400, and 600 cycles is significantly lower than that of Comparative example 1, namely, a battery without any overcharge protection agent added. In the embodiments, except for Embodiments 11, 12, 17 and 18, the battery capacity retention rates of other embodiments after 200, 400, and 600 cycles do not degrade compared to Embodiment 1, and are even better than that of Comparative example 1.

TABLE 2

| Electrolytes | Capacity retention rate after 200 cycles (%) | Capacity retention rate after 400 cycles (%) | Capacity retention rate after 600 cycles (%) |
|---|---|---|---|
| Embodiment 1 | 95 | 92 | 81 |
| Embodiment 2 | 96 | 93 | 85 |
| Embodiment 3 | 96 | 92 | 84 |
| Embodiment 4 | 96 | 93 | 86 |
| Embodiment 5 | 90 | 87 | 75 |
| Embodiment 6 | 93 | 90 | 77 |
| Embodiment 7 | 94 | 91 | 80 |
| Embodiment 8 | 96 | 94 | 87 |
| Embodiment 9 | 96 | 92 | 85 |

TABLE 2-continued

| Electrolytes | Capacity retention rate after 200 cycles (%) | Capacity retention rate after 400 cycles (%) | Capacity retention rate after 600 cycles (%) |
|---|---|---|---|
| Embodiment 10 | 96 | 94 | 88 |
| Embodiment 11 | 89 | 85 | 73 |
| Embodiment 12 | 90 | 85 | 74 |
| Embodiment 13 | 94 | 91 | 80 |
| Embodiment 14 | 95 | 93 | 86 |
| Embodiment 15 | 96 | 92 | 83 |
| Embodiment 16 | 96 | 91 | 85 |
| Embodiment 17 | 89 | 84 | 70 |
| Embodiment 18 | 90 | 85 | 72 |
| Comparative example 1 | 95 | 91 | 80 |
| Comparative example 2 | 90 | 87 | 78 |
| Comparative example 3 | 89 | 85 | 75 |
| Comparative example 4 | 87 | 78 | 60 |

(3) At room temperature, 4.2V lithium cobalt oxide/graphite batteries were overcharged at a rate of 1 C to 10 V after being fully charged, and the platform voltages during the overcharge process and the surface temperatures of the batteries under the condition of 130% SOC were recorded (measured by thermocouples). The results are shown in Table 3. The results show that, except for Comparative example 1, other embodiments and Comparative examples can maintain an overcharge platform voltage below 5 V during battery overcharging, demonstrating significant overcharge protection performance. Moreover, when the batteries were overcharged to 130% SOC, the temperature of the batteries in Embodiments 1-18 was lower than that in Comparative examples 2-4, indicating that Compounds 1-6 exhibit better overcharge protection performance compared to 2-fluorobiphenyl, and the heat released during their oxidative polymerization process is significantly lower than that of 2-fluorobiphenyl.

TABLE 3

| Electrolyte | Overcharge platform voltage (V) | Temperature @130% SOC (°C) |
|---|---|---|
| Embodiment 1 | 4.62 | 29 |
| Embodiment 2 | 4.79 | 27 |
| Embodiment 3 | 4.71 | 28 |
| Embodiment 4 | 4.88 | 28 |
| Embodiment 5 | 4.78 | 31 |
| Embodiment 6 | 4.73 | 30 |
| Embodiment 7 | 4.62 | 29 |
| Embodiment 8 | 4.79 | 29 |
| Embodiment 9 | 4.71 | 28 |
| Embodiment 10 | 4.88 | 28 |
| Embodiment 11 | 4.78 | 32 |
| Embodiment 12 | 4.73 | 31 |
| Embodiment 13 | 4.61 | 28 |
| Embodiment 14 | 4.78 | 29 |
| Embodiment 15 | 4.7 | 28 |
| Embodiment 16 | 4.86 | 29 |
| Embodiment 17 | 4.77 | 32 |
| Embodiment 18 | 4.72 | 31 |
| Comparative example 1 | 5.45 | 30 |
| Comparative example 2 | 4.87 | 35 |
| Comparative example 3 | 4.87 | 36 |
| Comparative example 4 | 4.86 | 36 |

Taking the cycling capacity retention rate and overcharge protection performance of the battery into consideration, Compound 4>Compound 2>Compound 3>Compound 1>other compounds, with a mass fraction of 3% being preferred, followed by 1%.

Embodiment 19

In an argon-filled glove box ($H_2O$<10 ppm, $O_2$<10 ppm), DMC, EC, and EMC were mixed well at a mass ratio of 1:1:1, to prepare a mixed solvent. Then, 1 equivalent amount of $LiPF_6$ was weighed and dissolved in the mixed solvent to prepare an electrolyte containing 1 mol/L $LiPF_6$. Finally, 1 wt % of Compound 1 and 1 wt % of PDO were added to the electrolyte to give the target electrolyte.

Embodiment 20

In an argon-filled glove box ($H_2O$<10 ppm, $O_2$<10 ppm), DMC, EC, and EMC were mixed well at a mass ratio of 1:1:1, to prepare a mixed solvent. Then, 1 equivalent amount of $LiPF_6$ was weighed and dissolved in the mixed solvent to prepare an electrolyte containing 1 mol/L $LiPF_6$. Finally, 1 wt % of Compound 2 and 1 wt % of PDO were added to the electrolyte to give the target electrolyte.

Embodiment 21

In an argon-filled glove box ($H_2O$<10 ppm, $O_2$<10 ppm), DMC, EC, and EMC were mixed well at a mass ratio of 1:1:1, to prepare a mixed solvent. Then, 1 equivalent amount of $LiPF_6$ was weighed and dissolved in the mixed solvent to prepare an electrolyte containing 1 mol/L $LiPF_6$. Finally, 1 wt % of Compound 4 and 1 wt % of PDO were added to the electrolyte to give the target electrolyte.

Embodiment 22

In an argon-filled glove box ($H_2O$<10 ppm, $O_2$<10 ppm), DMC, EC, and EMC were mixed well at a mass ratio of 1:1:1, to prepare a mixed solvent. Then, 1 equivalent amount of $LiPF_6$ was weighed and dissolved in the mixed solvent to prepare an electrolyte containing 1 mol/L $LiPF_6$. Finally, 1 wt % of Compound 1 and 2 wt % of PDO were added to the electrolyte to give the target electrolyte.

Embodiment 23

In an argon-filled glove box ($H_2O$<10 ppm, $O_2$<10 ppm), DMC, EC, and EMC were mixed well at a mass ratio of 1:1:1, to prepare a mixed solvent. Then, 1 equivalent amount of $LiPF_6$ was weighed and dissolved in the mixed solvent to prepare an electrolyte containing 1 mol/L $LiPF_6$. Finally, 1 wt % of Compound 2 and 2 wt % of PDO were added to the electrolyte to give the target electrolyte.

Embodiment 24

In an argon-filled glove box ($H_2O$<10 ppm, $O_2$<10 ppm), DMC, EC, and EMC were mixed well at a mass ratio of 1:1:1, to prepare a mixed solvent. Then, 1 equivalent amount of $LiPF_6$ was weighed and dissolved in the mixed solvent to prepare an electrolyte containing 1 mol/L $LiPF_6$. Finally, 1 wt % of Compound 4 and 2 wt % of PDO were added to the electrolyte to give the target electrolyte.

Embodiment 25

In an argon-filled glove box ($H_2O$<10 ppm, $O_2$<10 ppm), DMC, EC, and EMC were mixed well at a mass ratio of 1:1:1, to prepare a mixed solvent. Then, 1 equivalent amount of $LiPF_6$ was weighed and dissolved in the mixed solvent to prepare an electrolyte containing 1 mol/L $LiPF_6$. Finally, 1 wt % of Compound 1, 2 wt % of PDO, and 1 wt % of VC were added to the electrolyte to give the target electrolyte.

Embodiment 26

In an argon-filled glove box ($H_2O$<10 ppm, $O_2$<10 ppm), DMC, EC, and EMC were mixed well at a mass ratio of 1:1:1, to prepare a mixed solvent. Then, 1 equivalent amount of $LiPF_6$ was weighed and dissolved in the mixed solvent to prepare an electrolyte containing 1 mol/L $LiPF_6$. Finally, 1 wt % of Compound 1, 2 wt % of PDO, and 1 wt % of PS were added to the electrolyte to give the target electrolyte.

Embodiment 27

In an argon-filled glove box ($H_2O$<10 ppm, $O_2$<10 ppm), DMC, EC, and EMC were mixed well at a mass ratio of 1:1:1, to prepare a mixed solvent. Then, 1 equivalent amount of $LiPF_6$ was weighed and dissolved in the mixed solvent to prepare an electrolyte containing 1 mol/L $LiPF_6$. Finally, 1 wt % of Compound 1, 2 wt % of PDO, and 1 wt % of DTD were added to the electrolyte to give the target electrolyte.

Embodiment 28

In an argon-filled glove box ($H_2O$<10 ppm, $O_2$<10 ppm), DMC, EC, and EMC were mixed well at a mass ratio of 1:1:1, to prepare a mixed solvent. Then, 1 equivalent amount of $LiPF_6$ was weighed and dissolved in the mixed solvent to prepare an electrolyte containing 1 mol/L $LiPF_6$. Finally, 1 wt % of Compound 1, 2 wt % of PDO, and 1 wt % of $LiPO_2F_2$ were added to the electrolyte to give the target electrolyte.

Embodiment 29

In an argon-filled glove box ($H_2O$<10 ppm, $O_2$<10 ppm), DMC, EC, and EMC were mixed well at a mass ratio of 1:1:1, to prepare a mixed solvent. Then, 1 equivalent amount of $LiPF_6$ was weighed and dissolved in the mixed solvent to prepare an electrolyte containing 1 mol/L $LiPF_6$. Finally, 1 wt % of Compound 2, 2 wt % of PDO, and 1 wt % of VC were added to the electrolyte to give the target electrolyte.

Embodiment 30

In an argon-filled glove box ($H_2O$<10 ppm, $O_2$<10 ppm), DMC, EC, and EMC were mixed well at a mass ratio of 1:1:1, to prepare a mixed solvent. Then, 1 equivalent amount of $LiPF_6$ was weighed and dissolved in the mixed solvent to prepare an electrolyte containing 1 mol/L $LiPF_6$. Finally, 1 wt % of Compound 2, 2 wt % of PDO, and 1 wt % of PS were added to the electrolyte to give the target electrolyte.

Embodiment 31

In an argon-filled glove box ($H_2O$<10 ppm, $O_2$<10 ppm), DMC, EC, and EMC were mixed well at a mass ratio of 1:1:1, to prepare a mixed solvent. Then, 1 equivalent amount of $LiPF_6$ was weighed and dissolved in the mixed solvent to prepare an electrolyte containing 1 mol/L $LiPF_6$. Finally, 1 wt % of Compound 2, 2 wt % of PDO, and 1 wt % of DTD were added to the electrolyte to give the target electrolyte.

Embodiment 32

In an argon-filled glove box ($H_2O$<10 ppm, $O_2$<10 ppm), DMC, EC, and EMC were mixed well at a mass ratio of 1:1:1, to prepare a mixed solvent. Then, 1 equivalent amount of $LiPF_6$ was weighed and dissolved in the mixed solvent to prepare an electrolyte containing 1 mol/L $LiPF_6$. Finally, 1 wt % of Compound 2, 2 wt % of PDO, and 1 wt % of $LiPO_2F_2$ were added to the electrolyte to give the target electrolyte.

Embodiment 33

In an argon-filled glove box ($H_2O$<10 ppm, $O_2$<10 ppm), DMC, EC, and EMC were mixed well at a mass ratio of 1:1:1, to prepare a mixed solvent. Then, 1 equivalent amount of $LiPF_6$ was weighed and dissolved in the mixed solvent to prepare an electrolyte containing 1 mol/L $LiPF_6$. Finally, 1 wt % of Compound 4, 2 wt % of PDO, and 1 wt % of VC were added to the electrolyte to give the target electrolyte.

Embodiment 34

In an argon-filled glove box ($H_2O$<10 ppm, $O_2$<10 ppm), DMC, EC, and EMC were mixed well at a mass ratio of 1:1:1, to prepare a mixed solvent. Then, 1 equivalent amount of $LiPF_6$ was weighed and dissolved in the mixed solvent to prepare an electrolyte containing 1 mol/L $LiPF_6$. Finally, 1 wt % of Compound 4, 2 wt % of PDO, and 1 wt % of PS were added to the electrolyte to give the target electrolyte.

Embodiment 35

In an argon-filled glove box ($H_2O$<10 ppm, $O_2$<10 ppm), DMC, EC, and EMC were mixed well at a mass ratio of 1:1:1, to prepare a mixed solvent. Then, 1 equivalent amount of $LiPF_6$ was weighed and dissolved in the mixed solvent to prepare an electrolyte containing 1 mol/L $LiPF_6$. Finally, 1 wt % of Compound 4, 2 wt % of PDO, and 1 wt % of DTD were added to the electrolyte to give the target electrolyte.

Embodiment 36

In an argon-filled glove box ($H_2O$<10 ppm, $O_2$<10 ppm), DMC, EC, and EMC were mixed well at a mass ratio of 1:1:1, to prepare a mixed solvent. Then, 1 equivalent amount of $LiPF_6$ was weighed and dissolved in the mixed solvent to prepare an electrolyte containing 1 mol/L $LiPF_6$. Finally, 1 wt % of Compound 4, 2 wt % of PDO, and 1 wt % of $LiPO_2F_2$ were added to the electrolyte to give the target electrolyte.

Performance Comparison:

(1) At room temperature, 4.2V lithium cobalt oxide/graphite batteries were overcharged at a rate of 1 C to 10V after being fully charged, and the platform voltages during the overcharge process and the surface temperatures of the batteries under the condition of 130% SOC were recorded (measured by thermocouples). The results are shown in Table 4.

TABLE 4

| Electrolyte | Overcharge platform voltage (V) | Temperature @130% SOC (°C) |
|---|---|---|
| Embodiment 19 | 4.62 | 29 |
| Embodiment 20 | 4.79 | 27 |
| Embodiment 21 | 4.88 | 28 |
| Embodiment 22 | 4.62 | 30 |
| Embodiment 23 | 4.79 | 28 |
| Embodiment 24 | 4.88 | 28 |
| Embodiment 25 | 4.62 | 29 |

TABLE 4-continued

| Electrolyte | Overcharge platform voltage (V) | Temperature @130% SOC (°C) |
|---|---|---|
| Embodiment 26 | 4.62 | 29 |
| Embodiment 27 | 4.62 | 28 |
| Embodiment 28 | 4.62 | 29 |
| Embodiment 29 | 4.79 | 30 |
| Embodiment 30 | 4.79 | 29 |
| Embodiment 31 | 4.79 | 30 |
| Embodiment 32 | 4.79 | 29 |
| Embodiment 33 | 4.88 | 28 |
| Embodiment 34 | 4.88 | 29 |
| Embodiment 35 | 4.88 | 31 |
| Embodiment 36 | 4.88 | 30 |
| Comparative example 1 | 5.45 | 30 |
| Embodiment 1 | 4.62 | 29 |
| Embodiment 2 | 4.79 | 27 |
| Embodiment 4 | 4.88 | 28 |

The results show that only Comparative example 1 has an overcharge platform voltage greater than 5 V and has no overcharge protection effect due to that it does not contain 2-phenyl-benzothiazole or its derivative. Other embodiments and Comparative examples containing 2-phenyl-benzothiazole or its derivative show an overcharge platform voltage below 5 V, showing obvious overcharge protection performance. Moreover, all embodiments did not show a significant temperature increase when the batteries were overcharged to 130% SOC.

(2) Cycling test of 4.2 V lithium nickel cobalt manganese oxide (NMC532)/graphite batteries at a rate of 1 C was carried out at 45° C. The charge and discharge cut-off voltages were 4.2 V and 3.0 V, respectively. The battery capacity retention rate after 200, 400, and 600 cycles at a rate of 1 C is shown in Table 5.

Table 5

TABLE 5

| Electrolytes | Capacity retention rate after 200 cycles (%) | Capacity retention rate after 400 cycles (%) | Capacity retention rate after 600 cycles (%) |
|---|---|---|---|
| Embodiment 19 | 86 | 76 | 55 |
| Embodiment 20 | 90 | 85 | 60 |
| Embodiment 21 | 90 | 84 | 60 |
| Embodiment 22 | 87 | 79 | 60 |
| Embodiment 23 | 90 | 86 | 70 |
| Embodiment 24 | 90 | 84 | 71 |
| Embodiment 25 | 95 | 89 | 82 |
| Embodiment 26 | 96 | 90 | 84 |
| Embodiment 27 | 95 | 90 | 85 |
| Embodiment 28 | 95 | 89 | 82 |
| Embodiment 29 | 95 | 90 | 83 |
| Embodiment 30 | 96 | 90 | 84 |
| Embodiment 31 | 95 | 90 | 85 |
| Embodiment 32 | 95 | 90 | 86 |
| Embodiment 33 | 95 | 90 | 85 |
| Embodiment 34 | 96 | 90 | 84 |
| Embodiment 35 | 96 | 90 | 86 |
| Embodiment 36 | 96 | 90 | 87 |
| Comparative example 1 | 95 | 88 | 75 |
| Embodiment 1 | 85 | 70 | 40 |
| Embodiment 2 | 90 | 85 | 55 |
| Embodiment 4 | 89 | 83 | 50 |

It can be seen from the experimental results of Comparative example 1 and Embodiments 1, 2 and 4 that the capacity retention rate of the NMC532 battery containing 2-phenyl-benzothiazole or its derivative degraded seriously after high-temperature cycling. After 400 cycles, it was already below 80% of the initial capacity in Embodiment 1, and already close to 80% of the initial capacity in Embodiments 2 and 4, and the capacity retention rate in Comparative example 1 without any additives was close to 90%.

After the addition of PDO (Embodiments 19 to 24), the cycling performance of the batteries added with 2-phenyl-benzothiazole or its derivative at high temperatures was slightly improved, but the cycling performance at high temperatures was still inferior to that of Comparative example 1. Wherein, embodiments containing 2% of PDO are superior to embodiments containing 1% of PDO.

After the introduction of the third additive (Embodiments 25-36), the cycling performance of some embodiments at high temperatures is significantly improved, mainly in embodiments containing DTD and $LiPO_2F_2$.

To sum up, the combination of PDO and DTD or $LiPO_2F_2$ can effectively alleviate the cycling capacity fading at high temperatures caused by the addition of 2-phenyl-benzothiazole or its derivative, and do not affect the overcharge protection performance.

What is claimed is:

1. A non-aqueous electrolyte for overcharge protection, comprising a lithium salt, an organic solvent and an additive, wherein, the additive comprise 2-phenyl-benzothiazole or a derivative thereof having a structure shown in formula (1), 3-phenyl-1,4,2-dioxazol-5-one, and a third additive,

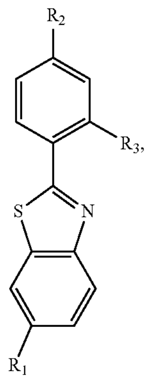

(1)

wherein, $R_1$, $R_2$ and $R_3$ are independently selected from the group consisting of H, Cl, and F, and wherein the third additive is selected from the group consisting of vinylene carbonate, 1,3-propane sultone, propene-1,3-sultone, ethylene sulfate, lithium difluorophosphate, and combinations thereof.

2. The non-aqueous electrolyte according to claim 1, wherein, the additive comprises one or more of the following compounds:

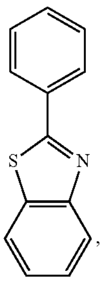, 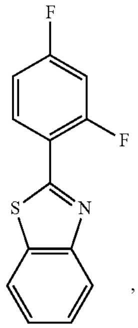, 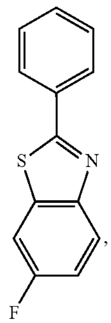, 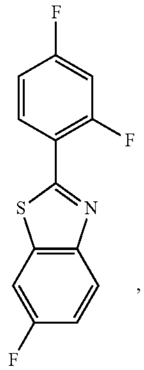, 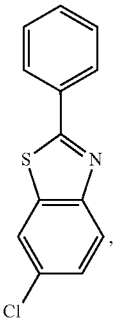, and 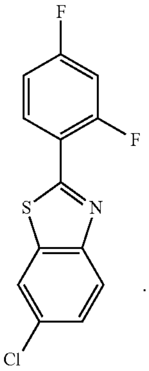.

3. The non-aqueous electrolyte according to claim 1, wherein, 2-phenyl-benzothiazole or a derivative thereof having the structure shown in formula (1) accounts for 0.1-10 wt % of a total mass of the non-aqueous electrolyte.

4. The non-aqueous electrolyte according to claim 3, wherein, 2-phenyl-benzothiazole or a derivative thereof having the structure shown in formula (1) accounts for 0.1-5 wt % of the total mass of the non-aqueous electrolyte.

5. The non-aqueous electrolyte according to claim 1, wherein, the third additive is ethylene sulfate and/or lithium difluorophosphate.

6. The non-aqueous electrolyte according to claim 1, wherein, feeding masses of 3-phenyl-1,4,2-dioxazol-5-one and the third additive are respectively and independently 0.1-10 wt % of a total mass of the non-aqueous electrolyte.

7. The non-aqueous electrolyte according to claim 1, wherein, feeding masses of 3-phenyl-1,4,2-dioxazol-5-one and the third additive are respectively and independently 0.1-5 wt % of the total mass of the non-aqueous electrolyte.

8. The non-aqueous electrolyte according to claim 1, wherein, the organic solvent comprises a cyclic ester and/or a chain ester, the cyclic ester is selected from the group consisting of γ-butyrolactone, ethylene carbonate, propylene carbonate, fluoroethylene carbonate, and combinations thereof; the chain ester is selected from the group consisting of dimethyl carbonate, ethyl methyl carbonate, diethyl carbonate, methyl propyl carbonate, methyl propionate, ethyl propionate, propyl propionate, methyl acetate, ethyl acetate, propyl acetate, methyl butyrate, ethyl butyrate, propyl butyrate, methyl fluoropropionate, ethyl fluoropropionate, ethyl fluoroacetate, and combinations thereof.

9. The non-aqueous electrolyte according to claim 1, wherein, the lithium salt is selected from the group consisting of lithium hexafluorophosphate, lithium tetrafluoroborate, lithium hexafluoroarsenate, anhydrous lithium perchlorate, lithium bis(trifluoromethanesulfonyl)imide, lithium difluorobis(oxalate)phosphate, lithium difluorophosphate, lithium trifluoromethanesulfonate, lithium difluorobisoxalate phosphate, lithium bis(oxalate) borate, lithium oxalyldifluoroborate, lithium difluorobisoxalate phosphate, and combinations thereof.

10. The non-aqueous electrolyte according to claim 1, wherein, concentration of the lithium salt is 0.6-1.5 mol/L.

11. A lithium-ion battery comprising a cathode, an anode, and an electrolyte, wherein, the electrolyte is the non-aqueous electrolyte according to claim 1.

12. The lithium-ion battery according to claim 11, wherein, the cathode is made of lithium cobalt oxide material or lithium nickel cobalt manganese oxide material, and the anode is made of graphite material.

* * * * *